(12) United States Patent
Matsuura et al.

(10) Patent No.: US 6,753,857 B1
(45) Date of Patent: Jun. 22, 2004

(54) METHOD AND SYSTEM FOR 3-D SHARED VIRTUAL ENVIRONMENT DISPLAY COMMUNICATION VIRTUAL CONFERENCE AND PROGRAMS THEREFOR

(75) Inventors: Norihiko Matsuura, Yokohama (JP); Shohei Sugawara, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/549,063

(22) Filed: Apr. 13, 2000

(30) Foreign Application Priority Data

Apr. 16, 1999 (JP) .......................................... 11-110151

(51) Int. Cl.[7] .............................................. G06T 17/00
(52) U.S. Cl. ..................................................... 345/419
(58) Field of Search ............................... 345/418, 419, 345/427, 420, 424, 426

(56) References Cited

U.S. PATENT DOCUMENTS

| | | | | |
|---|---|---|---|---|
| 6,151,028 A | * | 11/2000 | Kumagai et al. | 345/427 |
| 6,166,727 A | * | 12/2000 | Kozuka | 345/302 |
| 6,195,104 B1 | * | 2/2001 | Lyons | 345/473 |
| 6,215,498 B1 | * | 4/2001 | Filo et al. | 345/419 |
| 6,356,288 B1 | * | 3/2002 | Freeman et al. | 345/473 |
| 6,370,565 B1 | * | 4/2002 | Van Gong | 709/205 |

FOREIGN PATENT DOCUMENTS

JP          2539153          8/1996

OTHER PUBLICATIONS

Matsuura, et al., "Future and Applications of InterSpace", NTT Cyber Space Labs., pp. 25–30 (Jun. 25, 1996).

Matsuura, et al., "Development oof NetForum, a Multi-Point A/V Conference System", NTT Cyber Space Labs, pp. 7–12 (Oct. 21, 1999).

* cited by examiner

*Primary Examiner*—Cliff N. Vo
(74) *Attorney, Agent, or Firm*—Thelen Reid & Priest LLP; Robert E. Krebs

(57) ABSTRACT

The purpose is to provide a system and a method for 3-D shared virtual environment communication system to enable a plurality of users to share a common virtual environment so that real-time facial expressions of other users can be displayed on user's own terminal and voices heard. The system thus facilitate communications among the users in such cases as virtual conferencing environment. The method of operating the communication system is executed by computer application programs that contains a user information control section 102 broadcasts information input from the facial expression input section 103, voice input section 104 and motion information input section 105, to other user terminals through the network 30 under the control of the network control section 101. The avatar information managing section 107, script control section 108, virtual environment control section 109 and virtual environment generation section 110 displays other users' avatar on user's own terminal.

17 Claims, 6 Drawing Sheets

METHOD AND SYSTEM FOR 3-D SHARED VIRTUAL ENVIRONMENT DISPLAY COMMUNICATION VIRTUAL CONFERENCE AND PROGRAMS THEREFOR

BACKGROUND OF THE INVENTION

1. Field of the Invention

The present invention relates to a 3-dimensional virtual environment communication system, in which a number of users are connected to a central control equipment through communication lines to share the 3-D virtual environment created by 3-D computer graphics.

2. Description of the Related Art

Conventionally, there have been available television conferencing systems to enable a plurality of users located in different locations to confer with each other under the control of a central control equipment, or shared 3-D virtual environment communication systems based on 3-dimensional computer graphics technique (referred to as 3-D computer graphics hereinbelow). Television conferencing systems are used only for a very specialized purpose of conducting discussions among the users, and in the 3-D virtual shared environment communication based on 3-D computer graphics, there are systems that are based on text communications through chat-type format.

It has been difficult to introduce television conferencing systems based on central control equipment, because of the high cost of the equipment itself and communications cost associated with the conference. Also, although the 3-D virtual shared environment communications based on 3-D computer graphics have an advantage that the user is free to move about and the methodology is intuitive so that the system is user-friendly, however, because of the degree of user mobility is too high, the system is not suitable for use in the specialized purpose of conferencing, when it is desirable to face the person in conversation with or to have many users to confer with each together while viewing facial expressions of other participants on screen in real-time.

Therefore, it is important in those conferencing systems used for business purposes to hear each other's voices as well as to view the actual expressions on the users faces, and from the viewpoint of wider applicability of the communication system, it is desirable to increase the flexibility of the communication system.

SUMMARY OF THE INVENTION

It is a first object of the present invention to provide a system and a method for communication to enable a plurality of participants to share a 3-D virtual environment so that real-time facial expressions of other participants can be seen and voices of other participants heard on one's own terminal, thus making the system applicable to a virtual conferencing communication system.

Also, a second object is to realize a television conferencing capability that has been limited only to televising technology, by utilizing system and method customized to a conferencing format, and the system and method can be executed readily by providing computer-readable recorded medium containing executable application programs that enable to realize the communication system in a more flexible 3-D virtual environment that can be shared by a number of participants by displaying users' real-time facial images and reproducing voices on real-time on user terminals.

To realize the object, the present invention provides a method for displaying a three-dimensional shared virtual environment comprising the steps of: displaying a first display state of a virtual environment, generated by using a three-dimensional computer graphics technique, to be displayed in individual user terminals of a plurality of users so that a computer generated graphic object representing a subject user may be moved in accordance with instructions give by the subject user; and displaying a second display state of the virtual environment so that computer generated graphic objects representing the plurality of users are always located in constant positions within the virtual environment.

The method may further include a step of selecting either the first display state or the second display state according to instructions given by a user so as to display a selected virtual environment on the user terminal.

Accordingly, the method has an advantage that motion of the users within the virtual environment is natural and can be accepted intuitively, and when necessary, other users whose images are assigned to fixed locations may be reference for conferencing purpose, therefore, the system can be made quite flexible in meeting users' needs.

It is preferable that the method further includes the steps of: displaying pasted images of individual users by pasting corresponding real-time facial images on respective computer generated graphic objects representing the individual users so that, when displaying the second display state on a user terminal, front views of the computer generated graphic objects and corresponding pasted images are displayed. It is also preferable that a plurality of motion states for expressing intentions of a user represented by the computer generated graphic object be stored, so that a motion state selected uniquely according to a user instruction is pasted onto the computer generated graphic object and a pasted image is displayed.

The present invention also provides a three-dimensional shared communication system connecting a plurality of user terminals to central control means through communication lines, wherein each of the user terminals is comprised by: image inputting means for inputting real-time images of a user; voice audio inputting means for inputting voice data of the user; motion information inputting means for inputting motion information of the user within a virtual environment described by three-dimensional computer graphics; action indicating means for indicating actions of a computer generated graphic object representing the user to be displayed on terminal display means of other users; simple program outputting means for outputting a pre-determined simple program according to an instruction given by the action indicating means; user information input/output means for broadcasting received real-time image data, voice data, motion data and simple program data to other user terminals through the central control means, and receiving real-time image data, voice data, motion data and simple program data of the other users through the central control means; voice audio reproduction means for reproducing voices of the other users received by the user information inputting/outputting means; virtual environment control means for generating information required for displaying computer generated graphic objects representing the other users according to motion information and the simple program received by the user information input/output means from other user terminals, and controlling images displayed in such a way that the computer generated graphic objects are always displayed in assigned positions and facing frontward; and virtual environment display means for pasting real-time facial images of the other users in the computer generated graphic objects according to information generated by the virtual environment control means and displaying a combined image of the virtual environment and the pasted images.

It should be noted that the computer-generated graphic objects may be represented in two-dimensions or in three-dimensions. The motions of computer-generated graphic objects indicate users' intentions, such as "raise hand", "agree", and "reject". Front view of the computer-generated graphic object means that the pasted facial images are displayed so as to face the other users viewing the virtual environment on the monitor screen.

According to the present communication system, user terminals show virtual environment produced by computer graphics as well as facial images of other users who are participating in the virtual environment, which are pasted into computer-generated graphic objects corresponding to these users, and displayed along with their voices. It is also possible to express gestures of the participants through the computer-generated graphic objects. The system also allows the motion information input section to notify any changes in the position of the users so that, in spite of the motion of the users, computer-generated graphic objects representing the users remain in assigned positions and the front view of their facial images are displayed to the viewer of the virtual environment, which facilitates the communication process.

The present invention provides a three-dimensional shared communication system connecting a plurality of user terminals to central control means through communication lines, wherein the central control means stores information defining a plurality of types of virtual environments with individual addresses, and having at least one information defining a virtual conferencing environment; and each of the plurality of user terminals is comprised by: address specifying means for specifying addresses of information defining the virtual environments; image inputting means for inputting real-time images of a user; voice audio inputting means for inputting voice data of the user; motion information inputting means for inputting motion information of the user within a virtual environment described by three-dimensional computer graphics; action indicating means for indicating actions of a computer generated graphic object representing the user to be displayed on terminal display means of other users; simple program outputting means for outputting a pre-determined simple program according to an instruction given by the action indicating means; user information input/output means for broadcasting received real-time image data, voice data, motion data and simple program data to other user terminals through the central control means, and receiving real-time image data, voice data, motion data and simple program data of the other users through the central control means; voice audio reproduction means for reproducing voices of the other users received by the user information inputting/outputting means; virtual environment control means for generating information required for displaying the virtual environment according to information defining the virtual environment and motion information received by the user information input/output means from user terminals logging in to the virtual environment, and generating information required to display computer generated graphic objects representing the other users according to motion information and the simple program received; virtual environment display means for pasting real-time facial images of the other users in the computer generated graphic object according to information generated by the virtual environment control means, and displaying a combined image of the virtual environment and the pasted images, and wherein, when an address of information defining the virtual conferencing environment is specified by the address specifying means, the virtual environment control means control displays so that the computer generated graphic objects always remain in assigned locations and facing frontward.

According to the communication system presented above, in addition to the effects produced by the communication system disclosed in claims 1~3, it enables the user to readily switch between the virtual conferencing environment and another type of virtual environment to provide a more flexible communication system.

The present invention provides a virtual conferencing system for conducting a conference among users of the user terminals using one communication system chosen from any of the three-dimensional shared virtual environment communication systems presented above.

The present invention relates also to a method for communicating among a plurality of user terminals in a three-dimensional virtual environment shared through communication lines connected to each user terminal so as to exchange data between any one user terminal and other user terminals through central control means, comprising the steps of: inputting real-time images of a user of one user terminal produced by an imaging device provided in each user terminal; inputting voice of the user obtained by a sound recording device provided in each user terminal; inputting motion information of the user within the virtual environment described by three-dimensional computer graphics produced by a motion information input device provided in each user terminal; inputting action instructions of a computer generated graphic object, representing the user to be displayed in other user terminals; outputting a pre-determined simple program from the central control means in response to motion instructions input from the one user terminal; broadcasting real-time facial image data, voice audio data, motion information data, and the simple program, output from the one user terminal, to other user terminals through the central control means, and receiving real-time facial image data, voice audio data, motion information data of other users and the simple program, output from the other user terminals, in the one user terminal through the central control means; reproducing voices of other users received from the other user terminals at the one user terminal; generating information required for displaying computer generated graphic objects representing the other users using the user information input/output means according to motion information and the simple program, and controlling image orientations in such a way that the computer generated graphic objects are always displayed in assigned locations and facing frontward in the virtual conferencing environment; and pasting real-time facial images of the other users in the computer generated graphic objects according to generated information and displaying a combined image of the virtual environment and the pasted images.

The present method further includes the steps of: obtaining information related to users participating in the virtual environment being managed by the central control means; judging whether there has been a change in a number of users participating, based on information obtained; and altering computer generated graphic objects to be displayed in the virtual environment according to judged results.

Further, the present invention provides a method for communicating among a plurality of user terminals in a three-dimensional virtual environment shared through communication lines connected to each user terminal so as to exchange data between any one user terminal and other user terminals through central control means, comprising the steps of: inputting real-time images of a user of one user terminal produced by an imaging device provided in each user terminal; inputting voice of the user obtained by a sound recording device provided in each user terminal; inputting motion information of the user within the virtual environment described by three-dimensional computer graphics produced by a motion information input device provided in each user terminal; inputting action instructions of a computer generated graphic object, representing the user to be displayed in other user terminals; outputting a pre-determined simple program from the central control means in response to motion instructions input from the one user terminal; broadcasting real-time facial image data, voice audio data, motion information data, and the simple program, output from the one user terminal, to other user terminals through the central control means, and receiving real-time facial image data, voice audio data, motion information data of other users and the simple program, output from the other user terminals, in the one user terminal through the central control means; reproducing voices of other users received from the other user terminals at the one user terminal; specifying addresses to correspond to at least one of a plurality of types of virtual environments, including a virtual conferencing environment, identified by own addresses stored in the central control means; generating information necessary for displaying a relevant virtual environment according to information defining the relevant virtual environment identified by a specified address and motion information received from other user terminals logging in to the relevant virtual environment, and generating information necessary for displaying computer generated graphic objects representing the other users according to received information and the simple program; pasting real-time facial images of the other users in the computer generated graphic objects according to generated information and displaying a combined image of the virtual environment and the pasted images; and controlling orientation of images in such a way that the computer generated graphic objects are always displayed in assigned positions and facing frontward in the virtual conferencing environment.

The present invention also provides a computer-readable recording medium containing an application program for executing a method of communicating in a three-dimensional shared virtual environment using each of a plurality of user terminals, connected to central control means through communication lines, by means of a common virtual environment shared by the plurality of user terminals, comprising the steps of:

inputting real-time images of a user of one user terminal produced by an imaging device provided in each user terminal;

inputting voice of the user obtained by a sound recording device provided in each user terminal;

inputting motion information of the user within the virtual environment described by three-dimensional computer graphics produced by a motion information input device provided in each user terminal;

inputting action instructions of a computer generated graphic object, representing the user to be displayed in other user terminals;

outputting a pre-determined simple program from the central control means in response to motion instructions input from the one user terminal;

broadcasting real-time facial image data, voice audio data, motion information data, and the simple program, output from the one user terminal, to other user terminals through the central control means, and receiving real-time facial image data, voice audio data, motion information data of other users and the simple program, output from the other user terminals, in the one user terminal through the central control means;

reproducing voices of other users received from the other user terminals at the one user terminal;

generating information required for displaying computer generated graphic objects representing the other users using the user information input/output means according to motion information and the simple program, and controlling image orientations in such a way that the computer generated graphic objects are always displayed in assigned locations and facing frontward in the virtual conferencing environment; and pasting real-time facial images of the other users in the computer generated graphic objects according to generated information and displaying a combined image of the virtual environment and the pasted images.

In the computer-readable recording medium presented above, the application program may further contain the steps of: obtaining information related to users participating in the virtual environment being managed by the central control means; judging whether there has been a change in a number of users participating, based on information obtained; and altering computer generated graphic objects to be displayed in the virtual environment according to judged results.

The present invention further provides a computer-readable recording medium containing an application program for executing a method of communicating in a three-dimensional shared virtual environment using each of a plurality of user terminals, connected to central control means through communication lines, by means of a common virtual environment shared by the plurality of user terminals, comprising the steps of: inputting real-time images of a user of one user terminal produced by an imaging device provided in each user terminal; inputting voice of the user obtained by a sound recording device provided in each user terminal; inputting motion information of the user within the virtual environment described by three-dimensional computer graphics produced by a motion information input device provided in each user terminal; inputting action instructions of a computer generated graphic object, representing the user to be displayed in other user terminals; outputting a pre-determined simple program from the central control means in response to motion instructions input from the one user terminal; broadcasting real-time facial image data, voice audio data, motion information data, and the simple program, output from the one user terminal, to other user terminals through the central control means, and receiving real-time facial image data, voice audio data, motion information data of other users and the simple program, output from the other user terminals, in the one user terminal through the central control means; reproducing voices of other users received from the other user terminals at the one user terminal; specifying addresses to correspond to at least one of a plurality of types of virtual environments, including a virtual conferencing environment, identified by own addresses stored in the central control means; generating information necessary for displaying a relevant virtual environment according to information defining the relevant virtual environment identified by a specified address and motion information received from other user terminals logging in to the relevant virtual environment, and generating information necessary for displaying computer generated graphic objects representing the other users according to received information and the simple program; pasting real-time facial images of the other users in the computer generated graphic objects according to generated information and displaying a combined image of the virtual environment and the pasted images; and controlling orientation of images in such a way that the computer generated graphic objects are always displayed in assigned positions and facing frontward in the virtual conferencing environment.

DESCRIPTION OF THE PREFERRED EMBODIMENTS

In the following, the 3-D virtual shared environment communication system of the present invention (referred to as the communication system hereinafter) will be explained with reference to the drawings. This embodiment relates to a multi-point type 3-D virtual shared environment communication based on a central control equipment of the shared communication service (referred to as the server hereinafter) and a plurality of user terminals communicating with each other by way of a network.

In the communication system described above, each user terminal shares a virtual common space model (referred to as the virtual environment hereinafter), and each user of the terminal can change the view point and orientation of self by using the motion information input device (to be described later) so as to generate and display 3-D images of a virtual environment seen from the new view point and direction drawn by 3-D computer graphics. Also, the user terminal transmits information on the view point and direction of self to the server and to other user terminals at the same time.

Further, each user terminal generates and displays CG images representing other users partaking in the virtual environment (received via the server) and pastes real-time facial images forwarded from other user terminals on respective CG images as well as reproduces user voices sent in real-time, thus enabling to provide a conferencing virtual environment in the present communication system.

Figure 1:
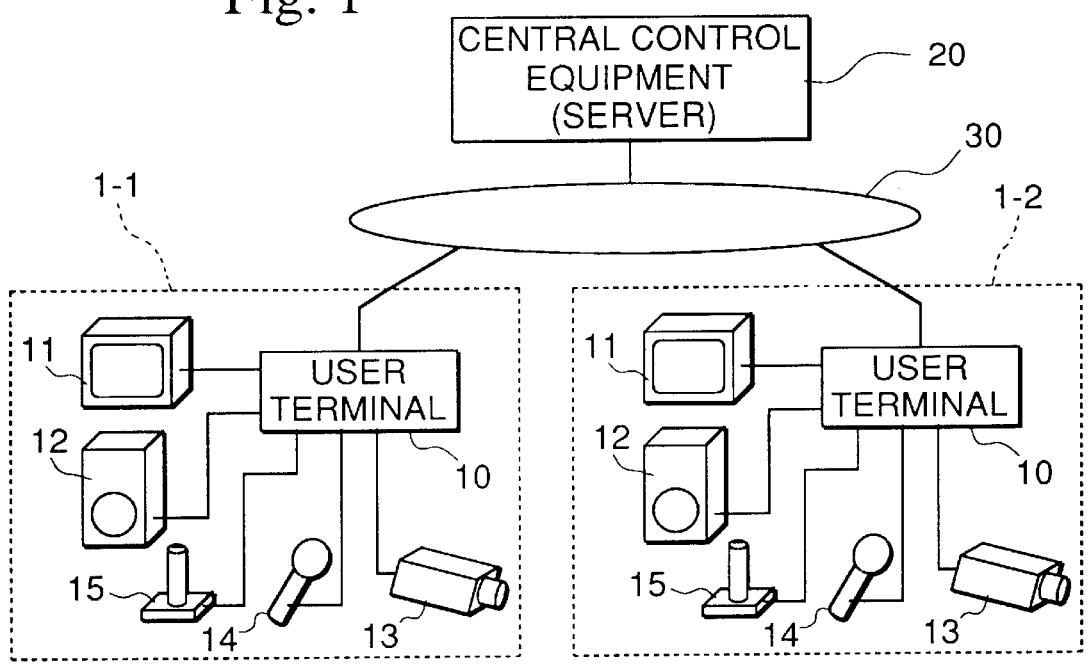
FIG. 1 is a block diagram of the system configuration in an embodiment of the 3-D virtual shared environment communication system.

As shown in FIG. 1, the communication system is comprised by a plurality of user terminals 1-1, 1-2 connected to each other by way of a network 30, and a server 20. Only two terminals are shown in FIG. 1 for illustrative purposes, but more user terminals may be accommodated.

As shown in this diagram, each of the user terminals 1-1, 1-2 is comprised by: a user terminal device 10 for controlling various information (to be described) exchanged among the users via the server 20; a display monitor 11 connected to own terminal for displaying the virtual environment; speaker(s) 12 for reproducing voices of other users and sound effects; a video camera 13 (recording device) for recording user's faces and the like; microphone 14 for transmitting user's voice and sound effects and the like; and a motion information input device 15, for use when the subject being recorded is moving, to indicate the view point and parameters of the view orientation.

Here, instead of the speaker 12, a headphone may be used. And, the motion information input device 15 may be a pointing device such as a mouse or a joystick.

Figure 2:
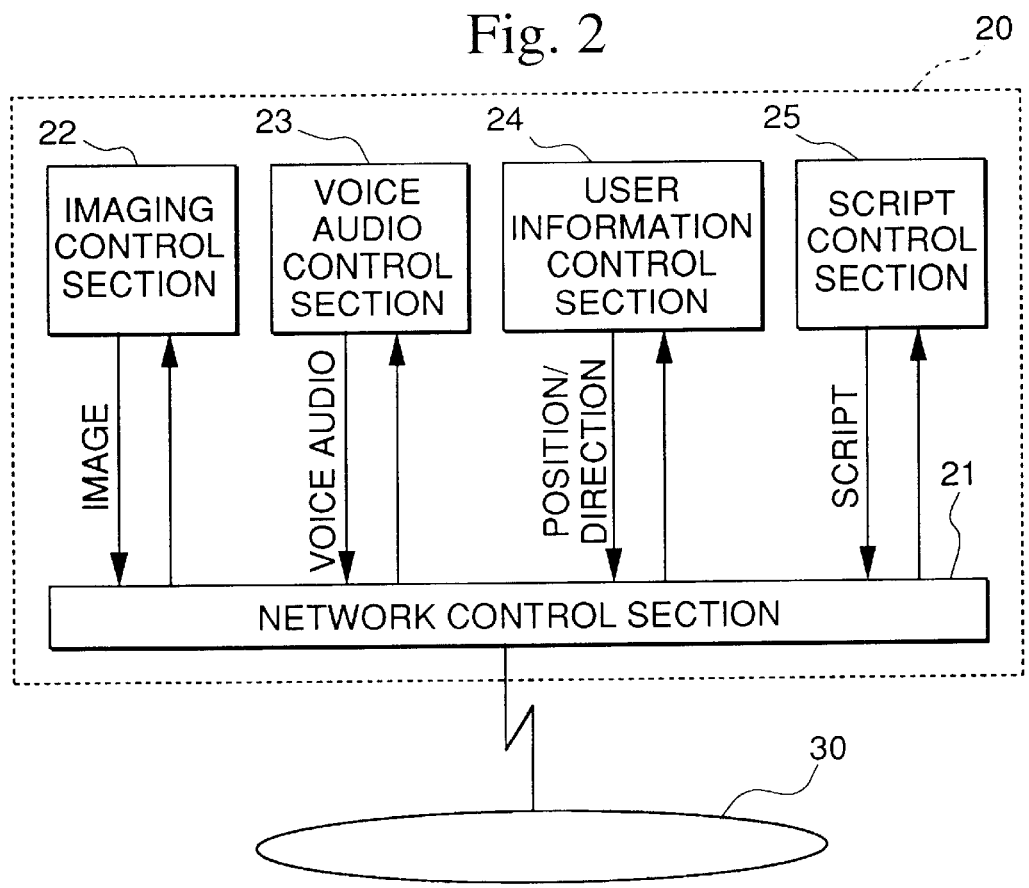
FIG. 2 is a block diagram of the structure of the central control equipment in the 3-D virtual shared environment communication system.

As shown in FIG. 2, the server 20 is comprised by: a network control section 21 for exchanging information through the network 30; an imaging control section 22 for receiving real-time image information recorded by the user at the user terminals, and distributing the image information to appropriate user terminals through the network control section 21; an audio control section 23 for receiving real-time voice audio information recorded by the user at the user terminals, and distributing the voice audio information to appropriate user terminals through the network control section 21; a user information control section 24 for distributing view point and view orientation information on the virtual environment received from each user terminal to appropriate user terminals through the network control section 21, and storing avatar information (to be described later) of users logging-in to the virtual environment managed by the server 20; a script control section 25 for transmitting simple programs (scripts) received from the user terminals to specific user terminals or broadcast to all the user terminals.

The server 20 stores information defining the virtual environments in a memory device (not shown). Such virtual environments may include spatial data depicting a town, buildings or room. Such information defining the virtual environment has own virtual world addresses (referred to as world address hereinafter) so that, when a world address is specified by a user terminal, information related to the virtual environment corresponding to the world address is sent to the requesting user terminal. The user terminal displays a virtual environment based on the received information produced by 3-D CG on the display monitor 11.

Figure 3:
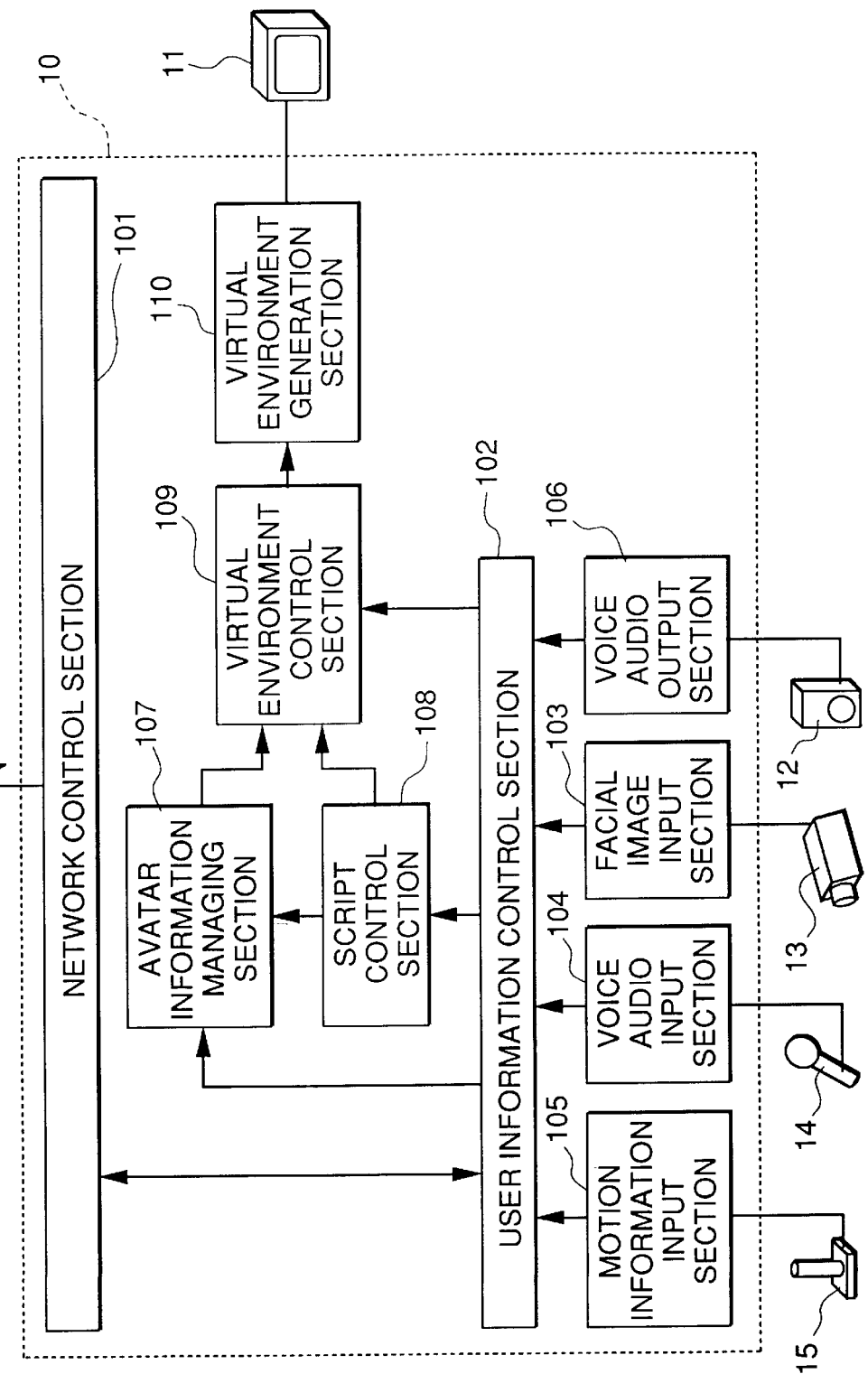
FIG. 3 is a block diagram of the structure of the user terminal in the 3-D virtual shared environment communication system.

As shown in FIG. 3, each of the user terminals 1-1, 1-2 is comprised by modules described below. First, the network control section 101 exchanges various information through the network 30. The user information control section 102 receives real-time image information, voice audio information, view point/view orientation information and script data received from other user terminals through the network control section 101, and transmit such information to various processing sections (to be described later). Also, real-time image information, voice audio information, view point/view orientation information input from the video camera 13, microphone 14, and motion information input device 15 are sent to the network control section 101.

Facial image input section 103 records real-time facial expressions of the users recorded by the video camera 13, and transmit such information successively to the server 20 through the network controller 101. The voice audio information input section 104 records user voice audio information input through the microphone 14, and successively outputs such information to the server 20 through the network control section 101.

The motion information input section 105 transmits view point information input by the motion information input device 15 as view point data in the respective user's virtual environment to the server 20 through the network control section 101. The voice audio output section 106 outputs voices of other users received from the server 20, through the network control section 101 and the user information control section 102, to the speaker 12.

The avatar information managing section 107 manages internal data (referred to as avatar information hereinafter) for displaying simple avatars. Here, an avatar in the present communication system relates to CG object representing a user displayed in the virtual environment. Also, in this embodiment, "simple avatar" relates to a 2-D object used for displaying an avatar. It is obvious that the users may be represented not by simple avatars but by a 3-D CG object.

The contents of the avatar information managed by the avatar information managing section 107 are: ① avatar ID, ② avatar position, ③ flag utilization, ④ user ID, and ⑤ animation state. Avatar ID is a unique number given to each avatar information representing other users. Avatar position represents a position of each simple avatar shown in the virtual environment by a coordinate system (x, y, z). Here, x- and y-coordinates relate to the positions on the surface of the display monitor 11, and z-coordinate relates to a position away from the screen surface to display a 3-D virtual environment. The values of x- and y-coordinates in this example are within a range of 0.0~1.0. Flag utilization indicates whether or not simple avatar is being utilized. User ID relates to user identification corresponding to the simple avatar being utilized. Animation state represents a value of actions of the simple avatar taken within the virtual environment, and is divided into four classes: NORMAL (normal state), RAISEHAND (hand raised state), OK (agree state), NOTOK (rejection state). These four motion states (gestures) are altered according to instructions by the users, and serve as means for communicating the intentions of one user to other users.

The script section 108 is used to decode scripts contained in the information received from the server 20 through the network control section 101 and the user information section 102, and to request the avatar managing section 107 to carry out the relevant processing. The virtual environment control section 109 generates information necessary to display virtual environment by 3-D CG according to the view point/view orientation information received from the motion information input section 105. Also, it generates information necessary for displaying simple avatar in the virtual environment according to the user's view point/view orientation and the avatar information stored in the avatar information managing section 107 obtained from the motion information input section 105.

The virtual environment generation section 110 generates display data for the virtual environment and simple avatars generated by the virtual environment control section 109, according to information necessary for showing virtual environment and simple avatars, and output the information to the display monitor 11. Also, at this time, facial images of other users, obtained through the network control section 101 and the user information control section 102, are pasted into respective regions corresponding to the faces of user's simple avatars, and the pasted images are output to display monitor 11.

Figure 4:
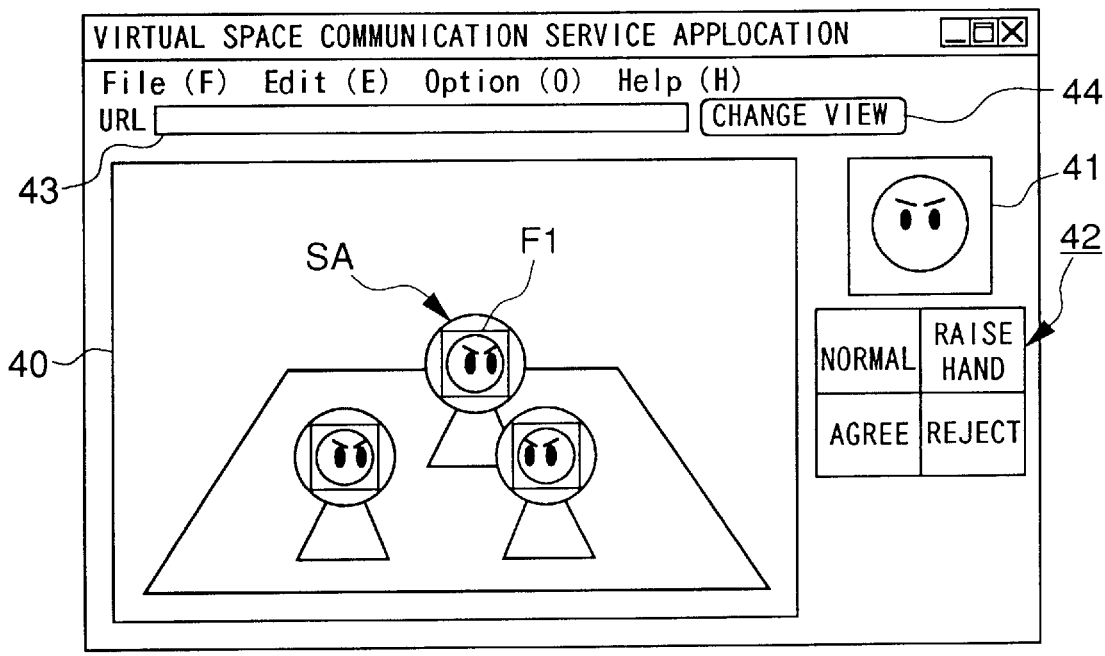
FIG. 4 is an illustration of the display on the screen of the user terminal in the 3-D virtual shared environment communication system.

An example of the displayed image at the user terminal in the communication system is illustrated in FIG. 4. A virtual environment generated by 3-D CG model and simple avatars SA representing other users partaking within that virtual environment are displayed in the virtual environment display region 40. Real-time facial images FI of the users corresponding to the simple avatars are pasted into the facial regions of the simple avatars SA in real-time. Own image display region 41 displays own facial image of the user being recorded by the video camera 13.

The avatar operation button 42 is a button to show the intention of a user using a user terminal (referred to as the subject user) to other users, and in this embodiment, there are four buttons corresponding to four intentions, "normal", "raise hand", "agree", and "reject". When any of theses button are pressed by the subject user, the display scene appearing in other user terminals is renewed to the intention expressed by the certain button pressed by the subject user. Specifically, if the subject user presses "raise hand" button, for example, the simple avatar of the subject user being displayed in other user terminals will be changed to a state depicting the subject user raising his hand.

Also, if a user inputs a world address that is desired to be connected in the world address input region 43 and presses the change view button 44, information defining the virtual environment corresponding to the input world address is down-loaded from the server 20, and the virtual environment based on this information is displayed on the display monitor 11.

In the above structure of the communication system, video camera 13 and the facial image input section 103 correspond to the image input means, and microphone 14 and the voice audio input section 104 to voice audio input means. The motion information input device 15 and motion information input section 105 correspond to motion information input means, and the voice audio output section 106 and speaker 12 correspond to voice audio output means. Also, the network control section 101 and the user information control section 102 correspond to user information input/output means, but the user information control section 102 corresponds also to the simple program output means.

Also, the avatar information managing section 107, script control section 108, and virtual environment control section 109 correspond to virtual environment control means and the virtual environment generation section 110 and the display monitor 11 correspond to virtual environment display means. Further, the avatar operation button 42 corresponds to the action indicating means, and world address input region 43 and change button 44 correspond to address specifying means.

Figure 5:
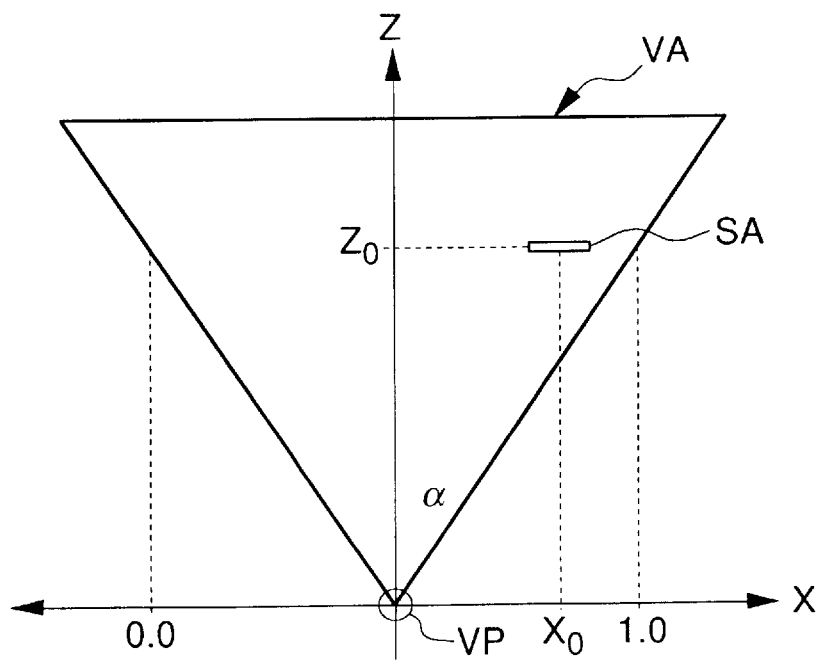
FIG. 5 is a diagram to illustrate a method for displaying simple avatar of the user terminal in the 3-D virtual shared environment communication system.

Next, a method for displaying the simple avatar in the present communication system will be explained with reference to FIG. 5. FIG. 5 shows a relationship between a view point VP and the display surface (viewing plane) VA that shows the actual display of 3-D CG image, but the y-axis is omitted for simplicity. Also, the angle α relates to an occluded angle between the view point VA of a user to the viewing plane VA. Processing steps for the y-axis are the same as those explained below for the x-axis.

First, the initial position of the simple avatar SA is given by the pre-determined initial position (x0, y0, z0) stored in the avatar information managing section 107. Then, when the view point or view orientation of the subject user within the virtual environment is altered by the action of the motion information input device 15 (refer to FIG. 3), the location of the simple avatar (x1, y1, z1) is given by the following relations based on the ratios of angles:

x1=(x0−0.5)×α×z0
y1=(y0−0.5)×α×y0
z1=z0.

Then, the initial position of the view point VP is moved to the derived position of the simple avatar SA.

Specifically, the present location of view point (xP, yP, zP) and view orientation (x0, y0, z0, w0) of the subject user in the virtual is obtained first by the virtual environment control section 109. The simple avatar SA is moved to the above location (xP, yP, zP) and the direction of the simple avatar is aligned to the direction given by the view orientation (x0, y0, z0, w0). Further, the new location of the simple avatar with respect to the present view point (xP, yP, zP) is obtained according to the relations given above, and the simple avatar SA is moved to the new location thus derived. This procedure assures that the simple avatar of the subject user displayed on the display monitor 11 is always the frontal facial expression to the subject user, even if the subject user moves about so that the view point and the view direction are altered.

Figure 6:
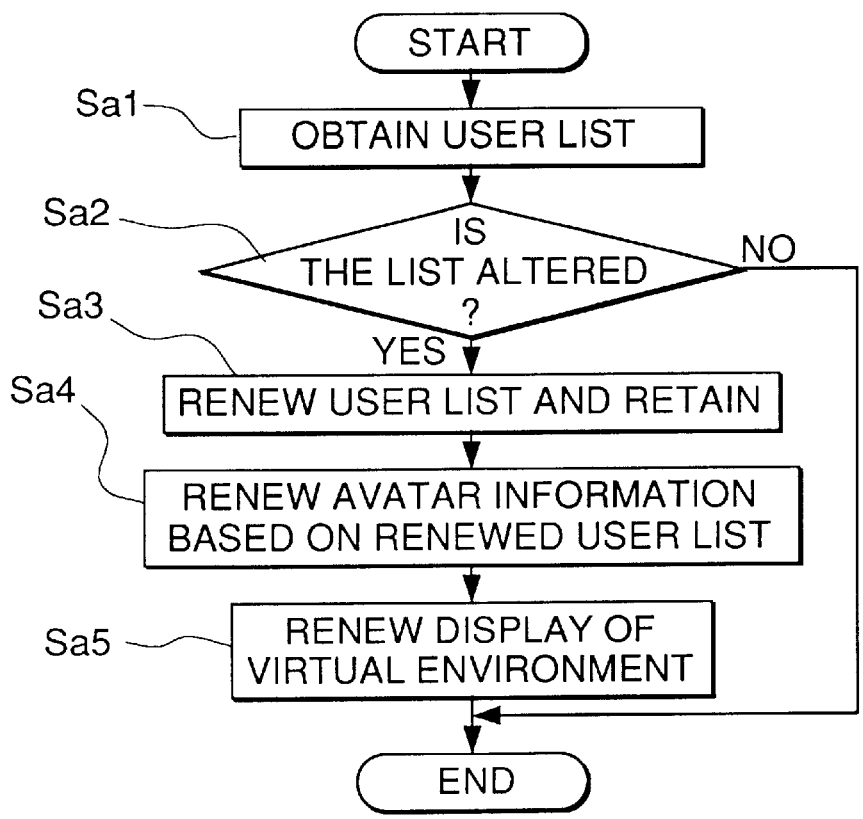
FIG. 6 is a flowchart for the avatar information processing in the 3-D virtual shared environment communication system.

Next, processing steps are indicated in the flowchart shown in FIG. 6. The steps shown in FIG. 6 apply to a case of a new user logging-in to the virtual environment, and a user already viewing the virtual environment is logging-out. These are only two examples of the many cases that the user terminal device 10 can process.

First, the avatar information managing section 107 obtains avatar information of other users being currently managed by the user information control section 24 of the server 20, through the network control section 101 and the user information control section 102 (step Sa1). Here, avatar information on other users are summarized in a user list containing the avatar ID, flag utilization, and animation state for each user ID.

A user list obtained from the server 20 is compared against the user list managed by the avatar information managing section 107 (step Sa2), and when there is no difference in the user IDs in the two types of user list, the result of judgment is No, and the process shown in FIG. 6 is completed, and the process moves to another process. On the other hand, when there are differences in the user IDs in the user lists, the result of judgment is Yes, the avatar information managing section 107 renews the current user list (step Sa3).

Specifically, when a new user logs-in, the new user ID is added to the current user list in the avatar information managing section 107. Also, when the user currently viewing the virtual environment logs-out, the exiting user ID is deleted from the user list in the avatar information managing section 107.

Next, the avatar information in the renewed user list is refreshed (step Sa4). Specifically, when a new user logs-in, an avatar ID that is not being flagged (flag utilization is cleared) is obtained for the new user by turning the flag to "1", and registers the flag corresponding to the user ID together with the user ID in step Sa3. Further, the animation state of the simple avatar is received from the user terminal of the newly logging user, and registers it to correspond with its user ID.

In the meantime, when other user logs-out, flag utilization of the simple avatar of the exiting user in the user list is cleared and its animation state is returned to NORMAL.

At this stage, the virtual environment control section 109 is requested to refresh the simple avatar to be consistent with the renewed avatar information. Accordingly, the virtual environment control section 109 refreshes the display contents of the simple avatar of the other user in the virtual environment on the basis of the renewed avatar information, and the virtual environment generation section 110 displays a new virtual environment including the simple avatar according to the contents of the renewed user list on the display monitor 11 (step Sa5).

In this case, it is possible to arrange the contents of the virtual environment such that, if a user having a special rank ID (for example a designate chairperson) logs-in, each user terminal can be instructed to activate a special seating arrangement predetermined for the chairperson so that the chairperson may always be seated in the center, for example.

Next, the operation of the simple avatar in the present communication system is expressed by avatar image change script (AVATAR_IMAGE_CHANGE). Specifically, when the avatar operation button 42, shown in FIG. 4, is pressed, the value of the animation state corresponding to the pressed button and user ID of the user who pressed the button are used as factors for the avatar image change scripts to be broadcast through the server 20 to all the user terminals. The user terminals receiving such information containing scripting in the user information control section 102 through the network control section 101, the received information is forwarded to the script control section 108 for processing the information.

The script control section 108 decodes the received script, and if the contents indicate avatar image change script, the avatar information managing section 107 is requested to process the information. The avatar information managing section 107 renews the state value of the animation state corresponding to the request, so that the virtual environment control section 109 can renew the display contents of the simple avatar of other users in the same virtual environment according to the renewed avatar information. The virtual environment generation section 110 constructs a new virtual environment to include the simple avatar based on the renewed avatar information, and refreshes the contents of the display being shown to other users viewing the same virtual environment and display the renewed information on the display monitor 11.

Figure 7:
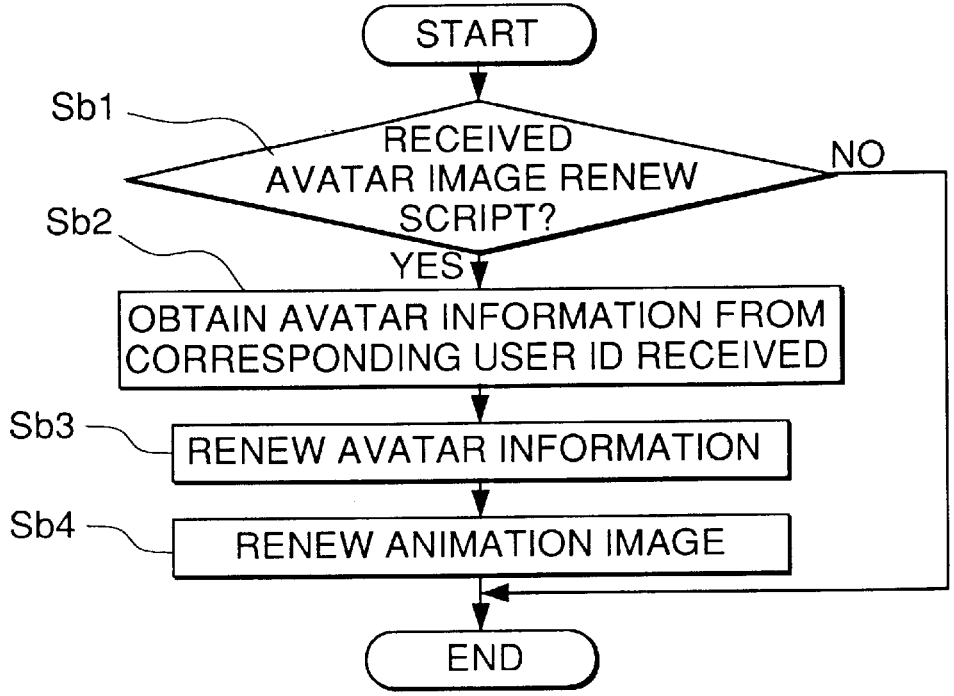
FIG. 7 is a flowchart for the avatar information processing operation in the 3-D virtual shared environment communication system.

A specific example of processing steps is shown in the flowchart in FIG. 7. As described above, when the user presses the avatar operation button 42, avatar image change script corresponding to the pressed button is broadcast to all the user terminals logging in to the same virtual environment through the server 20. The flowchart shown in FIG. 7 shows the processing steps when the user terminals receive avatar image change script.

First, the user information control section 102 receives various information related to other users through the network control section 101. When the script is contained in the received information, the script control section 108 is requested to process the received script.

Accordingly, the script control section 108 judges the type of script received by the user information control section 102 (step Sb1), and when it is judged that the received script is not the avatar information, the result of judging is No and the processing is finished. On the other hand, when the received information is judged to be the avatar image change script, the user ID contained in the avatar image change script is used as the key to obtain the avatar information related to that user from the avatar information control section 107 (step Sb2).

Then, the value of the animation state contained in the received avatar information is renewed to the value contained in the avatar image change script (step Sb3), and the changed value is returned to the avatar information managing section 107 and outputs the changed avatar information to the virtual environment control section 109. By so doing, the virtual environment control section 109 changes the avatar display state representing the subject user according to the avatar information forwarded from the script control section 108 (step Sb4).

Here, it should be noted that, in the communication system described above, although the scenes in the virtual environment will change according to the view point and view orientation instructed by the motion information input device 15, display positions in the simple avatar representing other users are not changed, and furthermore, the simple avatars are oriented so as to always show their front view.

Figure 8:
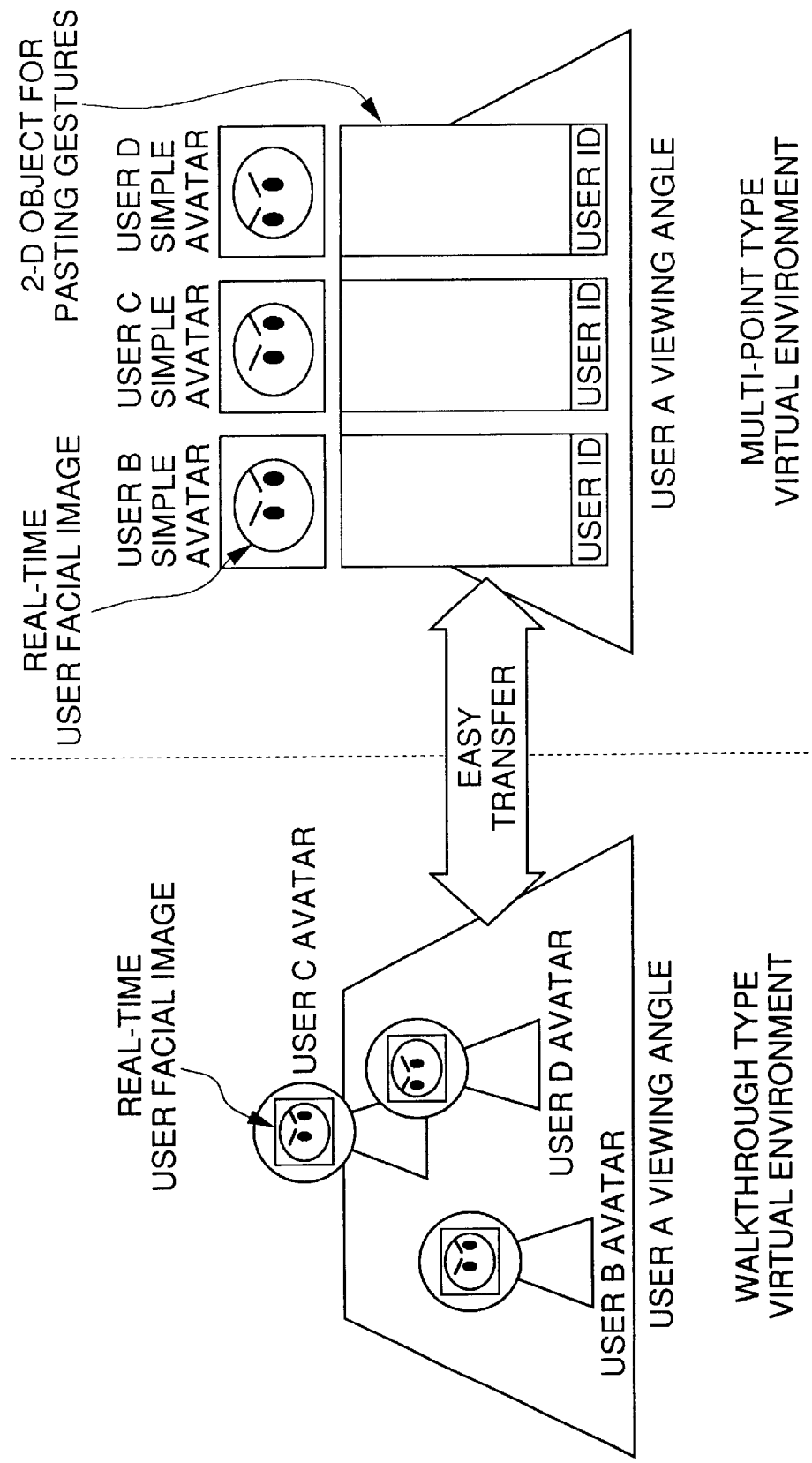
FIG. 8 is an example of two types of virtual environment.

However, as shown in FIG. 8 and described earlier, in the walkthrough type virtual environment in which the users are permitted to move freely in the virtual environment, as the degree of freedom of motion increases, it becomes more and more difficult to alter the orientation of users (so that the users face each other for the purpose of improved communication) for applications to specialized situations such as a conferencing virtual environment.

Such problems are resolved in the present invention by providing the walkthrough-type virtual environment shown in FIG. 8A, and the multi-point-type virtual environment shown in FIG. 8B. In the virtual environment shown in FIG. 8B, simple avatars related to other users are shown without reflecting any motion information. That is, when a user viewing the screen display (user A) gives some motion instruction, display control is performed successively so that although the view point and view orientation of user A in the virtual environment may be changed, each simple avatar always faces frontward.

Figure 9:
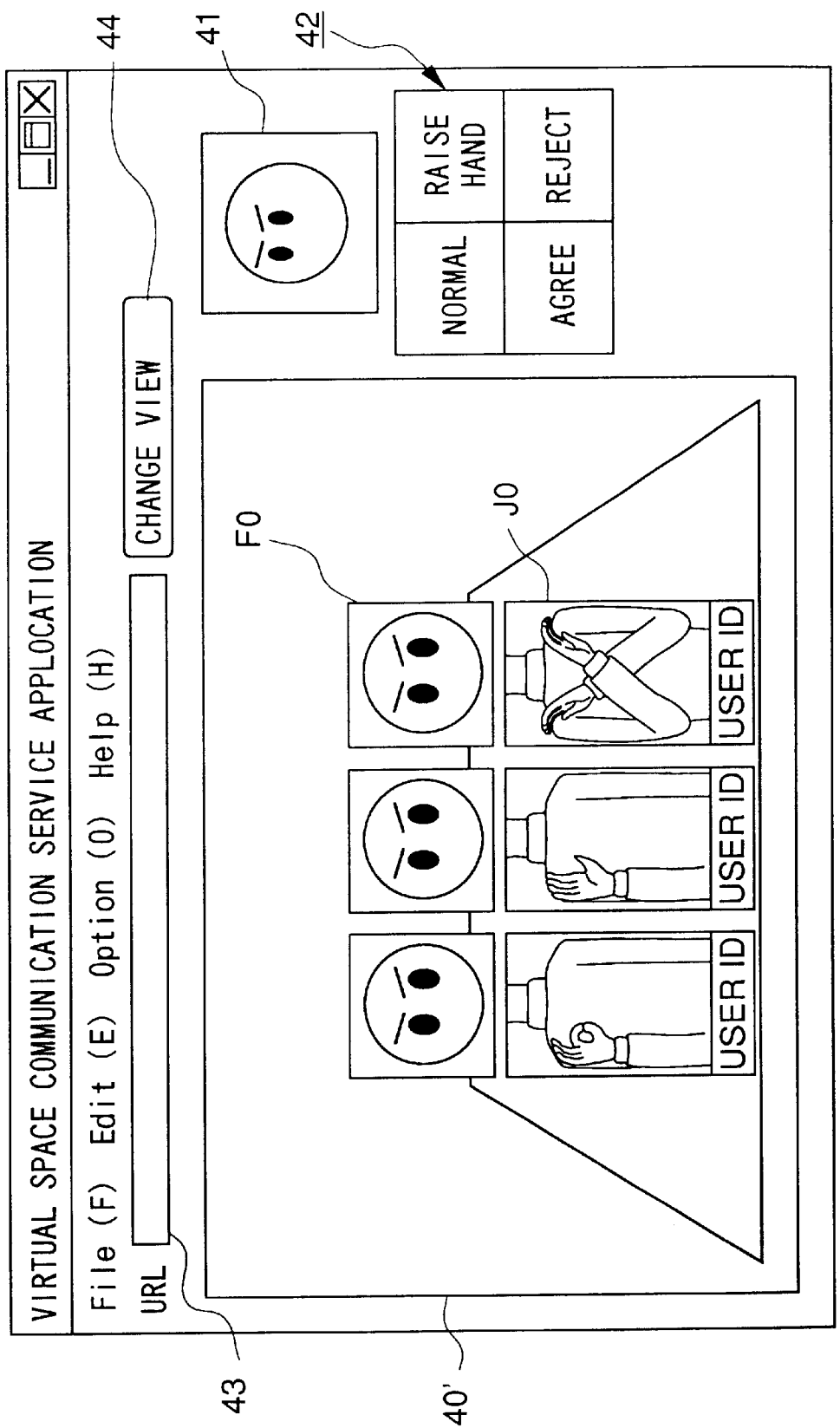
FIG. 9 is an example of screen displays obtained in the multi-point type virtual environment of the 3-D virtual shared environment communication system.

FIG. 9 shows further details of screen displays in the multi-point-type virtual environment communication system mentioned above. In FIG. 9, the structures that are the same as those in FIG. 4 are given the same reference numerals and their explanations are omitted. Simple avatars representing the other uses in the virtual environment 40' are shown on the same position in the z-axis of the virtual environment (refer to FIG. 5), and oriented so that they all face frontward to user A.

Also, these simple avatars are comprised by an object FO for pasting real-time facial images of each user and an object JO for pasting pictures representing the intentions of the respective users. When user A presses any one of the avatar operation buttons 42, the display of the object JO representing user A in the simple avatar changes to the action state corresponding to the pressed button. Displays of object JO shown in FIG. 9 represent, from the left, "agree", "raise hand", "disagree", respectively.

It should be noted that a more flexible system construction is possible so that the users can walkthrough two different types of virtual environments. For example, the server 20 may store information on a conferencing room environment represented by the multi-point-type virtual environment shown as virtual environment 40' in FIG. 9 with appropriate addresses. The server 20 may also store information on a waiting room environment represented by the walkthrough-type virtual environment shown in FIG. 8A, with appropriate addresses. The two types of virtual environments can then be accessed freely through a user terminal such as the one shown in FIG. 3 so that a desired world address can be input in the world address input region 43 shown in FIG. 9 and by pressing the change button 44 shown in display monitor 11.

Another arrangement of accessing two different virtual environments may be to provide a door in the conferencing virtual environment shown in FIG. 9, so that a user may click on the door to enter the waiting room virtual environment. In these cases, information defining the different types of virtual environments can be given separate world addresses so that all the information may be stored in a memory device connected to one server, or in a plurality of memory devices connected to respective servers.

In the examples presented above, the functions representing the various sections (network control section 101, user information control section 102, facial image input section 103, voice audio input section 104, motion information input section 105, voice audio output section 106, avatar information managing section 107, script control section 108, virtual environment control section 109, virtual environment generation section 110) as well as application programs for carrying out the processes shown in FIGS. 6, 7 may be recorded on a computer-readable recording medium, and loading such programs into a computer system for execution.

The present invention was demonstrated in one embodiment presented above, but the present invention is not to be limited to the specifics used in the examples, and may be modified freely within the scope of the invention. For example, it is important, for conferencing purposes, to view facial expressions while communicating with other users so that the example is arranged with real-time facial expressions to be reproduced. However, the present invention is obviously applicable when real-time facial expressions are not necessary.

Computer system, in this context, includes any operating systems (OS) and peripheral hardwares that are connected (directly or wirelessly). Computer system includes homepage portal environment (or display environment) when using www. system. Computer-readable recording media include portable media such as floppy disks, opto-magnetic disks, ROM, CD-ROM, as well as fixed devices such as hard disks housed in computer systems, but they also include such short-term, dynamic media for holding programs (transmission media and signal waves) to be used for sending software programs by way of networks such as Internet or telephone circuit communication lines, and also include those recording media that store programs for a limited duration such as volatile memories operating in the server or client computer systems.

Application program may perform a part of the described functions, or may be operated in conjunction with pre-recorded programs stored in computer systems. Application programs may perform a part of the described functions, or may be operated in conjunction with pre-recorded programs stored in computer systems to provide differential files (differential programs).

What is claimed is:

1. A method for displaying a three-dimensional shared virtual environment comprising the steps of:

displaying a first display state of a virtual environment, generated by using a three-dimensional computer graphics technique, to be displayed in individual user terminals of a plurality of users so that a computer generated graphic object representing a subject user may be moved in accordance with instructions give by said subject user; and displaying a second display state of said virtual environment so that computer generated graphic objects representing said plurality of users are always located in constant positions within said virtual environment.

2. A method according to claim 1, wherein said method further includes a step of selecting either said first display state or said second display state according to instructions given by a user so as to display a selected virtual environment on said user terminal.

3. A method according to claim 1, wherein said method further includes the steps of:
displaying pasted images of individual users by pasting corresponding real-time facial images on respective computer generated graphic objects representing said individual users so that, when displaying said second display state on a user terminal, front views of said computer generated graphic objects and corresponding pasted images are displayed.

4. A method according to claim 1, wherein a plurality of motion states for expressing intentions of a user represented by said computer generated graphic object are stored, and a motion state selected uniquely according to a user instruction is pasted onto said computer generated graphic object and a pasted image is displayed.

5. A three-dimensional shared communication system connecting a plurality of user terminals to central control means through communication lines, wherein each of said user terminals is comprised by:
image inputting means for inputting real-time images of a user;
voice audio inputting means for inputting voice data of said user;
motion information inputting means for inputting motion information of said user within a virtual environment described by three-dimensional computer graphics;
action indicating means for indicating actions of a computer generated graphic object representing said user to be displayed on terminal display means of other users;
simple program outputting means for outputting a pre-determined simple program according to an instruction given by said action indicating means;
user information input/output means for broadcasting received real-time image data, voice data, motion data and simple program data to other user terminals through said central control means, and receiving real-time image data, voice data, motion data and simple program data of said other users through said central control means;
voice audio reproduction means for reproducing voices of said other users received by said user information inputting/outputting means;
virtual environment control means for generating information required for displaying computer generated graphic objects representing said other users according to motion information and said simple program received by said user information input/output means from other user terminals, and controlling images displayed in such a way that said computer generated graphic objects are always displayed in assigned positions and facing frontward; and
virtual environment display means for pasting real-time facial images of said other users in said computer generated graphic objects according to information generated by said virtual environment control means and displaying a combined image of said virtual environment and said pasted images.

6. A three-dimensional shared communication system connecting a plurality of user terminals to central control means through communication lines, wherein said central control means stores information defining a plurality of types of virtual environments with individual addresses, and having at least one information defining a virtual conferencing environment; and
each of said plurality of user terminals is comprised by:
address specifying means for specifying addresses of information defining said virtual environments;
image inputting means for inputting real-time images of a user;
voice audio inputting means for inputting voice data of said user;
motion information inputting means for inputting motion information of said user within a virtual environment described by three-dimensional computer graphics;
action indicating means for indicating actions of a computer generated graphic object representing said user to be displayed on terminal display means of other users;
simple program outputting means for outputting a pre-determined simple program according to an instruction given by said action indicating means;
user information input/output means for broadcasting received real-time image data, voice data, motion data and simple program data to other user terminals through said central control means, and receiving real-time image data, voice data, motion data and simple program data of said other users through said central control means;
voice audio reproduction means for reproducing voices of said other users received by said user information inputting/outputting means;
virtual environment control means for generating information required for displaying said virtual environment according to information defining said virtual environment and motion information received by said user information input/output means from other user terminals logging in to said virtual environment, and generating information required to display computer generated graphic objects representing said other users according to motion information and said simple program received;
virtual environment display means for pasting real-time facial images of said other users in said computer generated graphic object according to information generated by said virtual environment control means, and displaying a combined image of said virtual environment and said pasted images, and wherein,
when an address of information defining said virtual conferencing environment is specified by said address specifying means,
said virtual environment control means control displays so that said computer generated graphic objects always remain in assigned locations and facing frontward.

7. A virtual conferencing system for conducting a conference among users of said user terminals using one communication system chosen from said three-dimensional shared virtual environment communication systems according to claim 5.

8. A method for communicating among a plurality of user terminals in a three-dimensional virtual environment shared through communication lines connected to each user terminal so as to exchange data between any one user terminal and other user terminals through central control means, comprising the steps of:
inputting real-time images of a user of one user terminal produced by an imaging device provided in each user terminal;

inputting voice of said user obtained by a sound recording device provided in each user terminal;

inputting motion information of said user within said virtual environment described by three-dimensional computer graphics produced by a motion information input device provided in each user terminal;

inputting action instructions of a computer generated graphic object, representing said user to be displayed in other user terminals;

outputting a pre-determined simple program from said central control means in response to motion instructions input from said one user terminal;

broadcasting real-time facial image data, voice audio data, motion information data, and said simple program, output from said one user terminal, to other user terminals through said central control means, and receiving real-time facial image data, voice audio data, motion information data of other users and said simple program, output from said other user terminals, in said one user terminal through said central control means;

reproducing voices of other users received from said other user terminals at said one user terminal;

generating information required for displaying computer generated graphic objects representing said other users using said user information input/output means according to motion information and said simple program, and controlling image orientations in such a way that said computer generated graphic objects are always displayed in assigned locations and facing frontward in said virtual conferencing environment; and pasting real-time facial images of said other users in said computer generated graphic objects according to generated information and displaying a combined image of said virtual environment and said pasted images.

9. A method according to claim 8, wherein said method further comprises the steps of:

obtaining information related to users participating in said virtual environment being managed by said central control means;

judging whether there has been a change in a number of users participating, based on information obtained; and altering computer generated graphic objects to be displayed in said virtual environment according to judged results.

10. A method for communicating among a plurality of user terminals in a three-dimensional virtual environment shared through communication lines connected to each user terminal so as to exchange data between any one user terminal and other user terminals through central control means, comprising the steps of:

inputting real-time images of a user of one user terminal produced by an imaging device provided in each user terminal;

inputting voice of said user obtained by a sound recording device provided in each user terminal;

inputting motion information of said user within said virtual environment described by three-dimensional computer graphics produced by a motion information input device provided in each user terminal;

inputting action instructions of a computer generated graphic object, representing said user to be displayed in other user terminals;

outputting a pre-determined simple program from said central control means in response to motion instructions input from said one user terminal;

broadcasting real-time facial image data, voice audio data, motion information data, and said simple program, output from said one user terminal, to other user terminals through said central control means, and receiving real-time facial image data, voice audio data, motion information data of other users and said simple program, output from said other user terminals, in said one user terminal through said central control means;

reproducing voices of other users received from said other user terminals at said one user terminal;

specifying addresses to correspond to at least one of a plurality of types of virtual environments, including a virtual conferencing environment, identified by own addresses stored in said central control means;

generating information necessary for displaying a relevant virtual environment according to information defining said relevant virtual environment identified by a specified address and motion information received from other user terminals logging in to said relevant virtual environment, and generating information necessary for displaying computer generated graphic objects representing said other users according to received information and said simple program;

pasting real-time facial images of said other users in said computer generated graphic objects according to generated information and displaying a combined image of said virtual environment and said pasted images; and controlling orientation of images in such a way that said computer generated graphic objects are always displayed in assigned positions and facing frontward in said virtual conferencing environment.

11. A computer-readable recorded medium containing an application program for executing a method of communicating in a three-dimensional shared virtual environment using each of a plurality of user terminals, connected to central control means through communication lines, by means of a common virtual environment shared by said plurality of user terminals, comprising the steps of:

inputting real-time images of a user of one user terminal produced by an imaging device provided in each user terminal;

inputting voice of said user obtained by a sound recording device provided in each user terminal;

inputting motion information of said user within said virtual environment described by three-dimensional computer graphics produced by a motion information input device provided in each user terminal;

inputting action instructions of a computer generated graphic object, representing said user to be displayed in other user terminals;

outputting a pre-determined simple program from said central control means in response to motion instructions input from said one user terminal;

broadcasting real-time facial image data, voice audio data, motion information data, and said simple program, output from said one user terminal, to other user terminals through said central control means, and receiving real-time facial image data, voice audio data, motion information data of other users and said simple program, output from said other user terminals, in said one user terminal through said central control means;

reproducing voices of other users received from said other user terminals at said one user terminal;

generating information required for displaying computer generated graphic objects representing said other users using said user information input/output means according to motion information and said simple program, and controlling image orientations in such a way that said computer generated graphic objects are always displayed in assigned locations and facing frontward in said virtual conferencing environment; and pasting real-time facial images of said other users in said computer generated graphic objects according to generated information and displaying a combined image of said virtual environment and said pasted images.

12. A computer-readable recorded medium according to claim 11, wherein said application program further contains the steps of:

obtaining information related to users participating in said virtual environment being managed by said central control means;

judging whether there has been a change in a number of users participating, based on information obtained; and altering computer generated graphic objects to be displayed in said virtual environment according to judged results.

13. A computer-readable recorded medium containing an application program for executing a method of communicating in a three-dimensional shared virtual environment using each of a plurality of user terminals, connected to central control means through communication lines, by means of a common virtual environment shared by said plurality of user terminals, comprising the steps of:

inputting real-time images of a user of one user terminal produced by an imaging device provided in each user terminal;

inputting voice of said user obtained by a sound recording device provided in each user terminal;

inputting motion information of said user within said virtual environment described by three-dimensional computer graphics produced by a motion information input device provided in each user terminal;

inputting action instructions of a computer generated graphic object, representing said user to be displayed in other user terminals;

outputting a pre-determined simple program from said central control means in response to motion instructions input from said one user terminal;

broadcasting real-time facial image data, voice audio data, motion information data, and said simple program, output from said one user terminal, to other user terminals through said central control means, and receiving real-time facial image data, voice audio data, motion information data of other users and said simple program, output from said other user terminals, in said one user terminal through said central control means;

reproducing voices of other users received from said other user terminals at said one user terminal;

specifying addresses to correspond to at least one of a plurality of types of virtual environments, including a virtual conferencing environment, identified by own addresses stored in said central control means;

generating information necessary for displaying a relevant virtual environment according to information defining said relevant virtual environment identified by a specified address and motion information received from other user terminals logging in to said relevant virtual environment, and generating information necessary for displaying computer generated graphic objects representing said other users according to received information and said simple program;

pasting real-time facial images of said other users in said computer generated graphic objects according to generated information and displaying a combined image of said virtual environment and said pasted images; and controlling orientation of images in such a way that said computer generated graphic objects are always displayed in assigned positions and facing frontward in said virtual conferencing environment.

14. A method according to claim 2, wherein said method further includes the steps of:

displaying pasted images of individual users by pasting corresponding real-time facial images on respective computer generated graphic objects representing said individual users so that, when displaying said second display state on a user terminal, front views of said computer generated graphic objects and corresponding pasted images are displayed.

15. A method according to claim 2, wherein a plurality of motion states for expressing intentions of a user represented by said computer generated graphic object are stored, and a motion state selected uniquely according to a user instruction is pasted onto said computer generated graphic object and a pasted image is displayed.

16. A method according to claim 3, wherein a plurality of motion states for expressing intentions of a user represented by said computer generated graphic object are stored, and a motion state selected uniquely according to a user instruction is pasted onto said computer generated graphic object and a pasted image is displayed.

17. A virtual conferencing system for conducting a conference among users of said user terminals using one communication system chosen from said three-dimensional shared virtual environment communication systems according to claim 6.

* * * * *